(12) United States Patent
Matt

(10) Patent No.: US 9,132,512 B2
(45) Date of Patent: Sep. 15, 2015

(54) DEVICE FOR THE THERMAL DEBURRING OF WORKPIECES

(71) Applicant: Kennametal Inc., Latrobe, PA (US)

(72) Inventor: Patrick Matt, Marktoberdorf (DE)

(73) Assignee: KENNAMETAL EXTRUDE HONE GMBH, Holzgunz (DE)

(*) Notice: Subject to any disclaimer, the term of this patent is extended or adjusted under 35 U.S.C. 154(b) by 0 days.

(21) Appl. No.: 14/252,082

(22) Filed: Apr. 14, 2014

(65) Prior Publication Data

US 2014/0339746 A1    Nov. 20, 2014

Related U.S. Application Data

(62) Division of application No. 12/376,849, filed as application No. PCT/EP2007/057770 on Jul. 27, 2007, now Pat. No. 8,696,977.

(30) Foreign Application Priority Data

Aug. 15, 2006   (DE) .......................... 10 2006 038 309

(51) Int. Cl.
*B23K 7/06* (2006.01)
*B23K 28/00* (2006.01)
*B23K 7/00* (2006.01)
*B23D 79/00* (2006.01)

(52) U.S. Cl.
CPC .............. *B23K 28/00* (2013.01); *B23D 79/005* (2013.01); *B23K 7/00* (2013.01); *B23K 7/06* (2013.01)

(58) Field of Classification Search
CPC ........ B23D 79/005; B23K 28/00; B23K 7/00; B23K 7/06; B23K 7/08

USPC ........ 266/51, 44, 249, 251, 48, 252; 432/247, 432/205; 148/200, 202; 414/147, 150; 29/33 A

See application file for complete search history.

(56) References Cited

U.S. PATENT DOCUMENTS

| | | | |
|---|---|---|---|
| 3,468,104 A * | 9/1969 | Willett ............................ | 96/361 |
| 4,025,062 A | 5/1977 | Johnstone et al. | |
| 4,394,334 A * | 7/1983 | Kiss ................................ | 264/80 |
| 4,561,839 A * | 12/1985 | Neumann ........................ | 431/6 |
| 4,595,359 A * | 6/1986 | Conrad et al. ................ | 432/205 |
| 4,597,786 A | 7/1986 | Nakai et al. | |
| 4,721,458 A * | 1/1988 | Conrad .......................... | 432/205 |
| 4,740,152 A | 4/1988 | Conrad et al. | |
| 4,796,867 A * | 1/1989 | Bozhko et al. .................. | 266/51 |
| 4,925,499 A | 5/1990 | Wohr | |
| 6,334,928 B1 | 1/2002 | Sekine et al. | |
| 6,383,461 B1 * | 5/2002 | Lang .............................. | 423/235 |
| 6,905,533 B2 | 6/2005 | Becker et al. | |
| 7,105,054 B2 | 9/2006 | Lindfors | |
| 2003/0200867 A1 | 10/2003 | Becker et al. | |

FOREIGN PATENT DOCUMENTS

EP   1232822 A1   8/2002
JP   5293328 A    11/1993

* cited by examiner

*Primary Examiner* — Scott Kastler
*Assistant Examiner* — Michael Aboagye
(74) *Attorney, Agent, or Firm* — Matthew Gordon

(57) ABSTRACT

The invention relates to a device for the thermal deburring of workpieces, having at least one deburring chamber and one feeding device for introducing a fuel gas mixture into the deburring chamber. A supplementary gas supply is provided for at least the deburring chamber or for the feeding device such that the fuel gas mixture located at least in the deburring chamber or in the feeding device can be mixed at least partially with supplementary gas. Further, a method for the rapid ventilation of a device for the thermal deburring of workpieces is also provided.

3 Claims, 2 Drawing Sheets

DEVICE FOR THE THERMAL DEBURRING OF WORKPIECES

CROSS REFERENCE TO RELATED APPLICATIONS

This application is a divisional application of U.S. patent application Ser. No. 12/376,849, filed May 26, 2010, issued on Apr. 15, 2014 as U.S. Pat. No. 8,696,977 entitled "Device for the Thermal Deburring of Workpieces," which was the national stage of International Application No. PCT/EP2007/057770 filed Jul. 27, 2007 which claims priority to German Patent Application No. DE 10 2006 038 309.5 filed Aug. 15, 2006, which are hereby incorporated by reference in their entirety.

BACKGROUND OF THE INVENTION

1. Field of the Invention

The present invention relates to a device for the thermal deburring of workpieces, comprising at least one deburring chamber and a feed means for introducing a fuel gas mixture into the deburring chamber.

2. Description of the Related Art

In installations for the thermal deburring of workpieces, random material removal takes place during which the entire workpiece is subjected to a heat shock. Corners and edges are preferably removed, since these locations, with a large surface and small volume, absorb an especially large amount of heat and are thus oxidized and burned. The heat shock is achieved by burning off a fuel gas mixture which preferably comprises a fuel gas, such as, for example, hydrogen, natural gas or methane, and an oxidizing gas, such as, in particular, oxygen.

To carry out this method, at least one workpiece is inserted into the deburring chamber, for example with a "closing plate", such that that a closed-off combustion chamber is formed with the deburring chamber. The fuel gas mixture is then introduced into this closed deburring chamber. The fuel gas mixture can be fed in such a way that the individual gas constituents are introduced separately into the deburring chamber; mixed feeding of the fuel gas constituents, at least in a last section of the feed process, is preferred in this case. In the process, depending on the size of the deburring chamber or the number of workpieces, very high positive pressures can be realized, for example up to 50 bar.

By corresponding ignition means, for example a spark plug, which can be installed in the region of the combustion chamber or else in a feed passage through to the deburring chamber, the fuel gas mixture is then ignited, such that the heat shock described at the beginning is generated.

After this thermal deburring method has been carried out and in particular in the event of abnormal occurrences, if, for example, no ignition is effected, the gas volume located at positive pressure in the combustion chamber then has to be released again. To this end, it was to begin with normal practice to simply open the deburring chamber, that is to say, for example, to remove the closing plate from the deburring chamber. However, it has been found with this method that very pronounced contamination could occur in the entire region between closing plate and deburring chamber, and this contamination may possibly also result in abrasive wear of the seal provided between the deburring chamber and the closing plate.

A further development is described in EP 1 232 822 A1. It is proposed there that a quick-acting vent valve be assigned to the deburring chamber, via which quick-acting vent valve the gas present in the deburring chamber can be released. This also provides, for example, the possibility of cleaning the deburring oxides and residues via a filter.

However, it has to be taken into account that, in cases where there is still an ignitable or explosive fuel gas mixture in the combustion chamber, such rapid outflow via such a quick-acting vent valve may possibly be dangerous. In this case, it should in particular be borne in mind that with some ignitable fuel gas mixtures even a low energy feed is sufficient to possibly trigger an ignition. For this reason, in the case of such quick-acting vent valves, the release is regularly realized in such a way that the flow velocities through the central valve are kept very low in order to avoid ignition of the fuel gas mixture as a result of gas friction for example. If the fact that such quick-acting vent valves are provided with a very small diameter is taken into account, the slow release of the explosive fuel gas mixture from the deburring chamber, in particular if the latter has a large volume, results in long downtimes of the installation.

Proceeding therefrom, the object of the invention is to at least partly solve the problems described with reference to the prior art. In particular, a device and a method are to be specified which make possible short venting times and at the same time rule out the risk of self-ignition.

SUMMARY OF THE INVENTION

These objects are achieved with a device for thermal deburring having the features of patent claim 1 and with a method of removing an explosive fuel gas mixture from a device for thermal deburring according to the features of patent claim 7. Further advantageous configurations of the invention are specified in the dependent patent claims. It should be noted that the features cited individually in the patent claims can be combined with one another in any desired, technologically appropriate manner and show further configurations of the invention. In addition, the features are further specified and explained in the description, such that preferred developments of the invention result therefrom.

The device according to the invention for the thermal deburring of workpieces comprises at least one deburring chamber and a feed means for introducing a fuel gas mixture into the deburring chamber, a supplementary gas feed being provided for at least the deburring chamber or the feed means, such that the fuel gas mixture located at least in the deburring chamber or the feed means can be at least partly mixed with supplementary gas.

The device preferably comprises precisely one deburring chamber and a corresponding feed means; but the feed means may nonetheless also be provided for a plurality of deburring chambers, in particular of different size. On account of the high pressures prevailing therein, such a feed means regularly comprises solid components in which bores are incorporated, through which some of the fuel gas mixture or the entire fuel gas mixture can be directed through to the deburring chamber. The feed means and the deburring chamber are regularly connected to one another in such a way that in particular a merging feed passage is formed. Parts of the feed means in this case are in particular pressure generators, such as delivery pumps for example, linear actuators or the like, mixing chambers, supply tanks and the like.

Here, a supplementary gas feed is now proposed which can certainly also be provided in principle at a plurality of locations, although provision of the supplementary gas feed directly at the deburring chamber or at a component of the feed means is preferred here. Within the scope of the present invention, the term "supplementary gas" refers to any substance which is gaseous during the feeding and the admixing of which to form an ignitable gas mixture reduces the risk of an undesired ignition. In this sense, water vapor, for example, is also a supplementary gas. Additional measures, such as, for example, cooling, removal of possible ignition sources, etc., can assist the effect of the supplementary gas. In this case, the supplementary gas feed is positioned or configured in such a way that a supplementary gas can thus be fed to the fuel gas mixture, wherein in particular a flow of the supplementary gas into that section of the device in which the fuel gas mixture is normally located at the instant of ignition is made possible. This supplementary gas feed comprises as a rule at least one line section which opens, for example, into a feed passage of the feed means or into the combustion chamber or a central valve for the quick venting of the deburring chamber.

The feeding of a supplementary gas ensures that the explosive atmosphere of the ignitable fuel gas mixture is removed. An explosion is due to the simultaneous presence of an ignition source and an explosive atmosphere. In order to be able to effectively prevent an explosion, all ignition sources must be ruled out and/or the explosive atmosphere removed. Since it is generally not possible to reliably remove all ignition sources, the composition of the fuel gas mixture must be influenced by a supplementary gas to such an extent that the mixture is outside the explosion limits and can no longer ignite even when flowing out into the ambient atmosphere, in the course of which excess oxygen is produced.

In other words, this means that the composition of the fuel gas mixture is influenced by a supplementary gas to such an extent that, for example, the tendency of the fuel gas mixture to self-ignite is significantly reduced. In this case, a partial volume of the fuel gas mixture can in principle be mixed with supplementary gas, for example the fuel gas volume located or flowing past in the region of the quick-acting vent valve; however, it is also possible to correspondingly inertize the entire volume of the fuel gas mixture. The result of the inertization is that firstly the positive pressure in the deburring chamber is increased if need be and secondly greater flow velocities can be realized when releasing the gas flow of fuel gas mixture and supplementary gas. This leads overall to a marked reduction in the downtime of the device.

According to a preferred development of the device, a central valve is provided for at least the deburring chamber or the feed means, via which central valve the fuel gas mixture can be removed from the deburring chamber or the feed means, the supplementary gas feed, as viewed in an outflow direction of the fuel gas mixture, being arranged upstream of the central valve. Especially preferred is the embodiment variant in which the deburring chamber has a bore, adjoining which is the central valve. Especially in such a configuration of the deburring chamber, it is preferred that the supplementary gas feed open into the bore directly upstream of the central valve. This has in particular the advantage that only relatively small volumes of the fuel gas mixture, which can be inertized more simply with the supplementary gas, flow past at this point. Even though a corresponding arrangement to the feed means is possible in principle, the positioning of the central valve directly at the deburring chamber is nonetheless preferred.

In addition, it is proposed that a central valve be provided for at least the deburring chamber or the feed means, via which central valve the fuel gas mixture can be removed from the deburring chamber or the feed means, the central valve having a flow cross section which is greater than 2 mm². The inertization of the fuel gas mixture proposed here now makes it possible to release the fuel gas mixture much more quickly from the deburring chamber. This effect can be further increased by the central valve having a large flow cross section. Especially preferred are flow cross sections in the region above 10 mm², in particular even above at least 20 mm². In the case of essentially circular flow cross sections, diameters of at least 2 mm, in particular 4 mm, are preferred. In general, diameters which are as large as possible and which are determined only by the size of the existing components should be used in order to realize the shortest possible venting times.

According to a development of the device, the feed means has a mixing block with a central feed passage, the supplementary gas feed opening into this central feed passage. This central feed passage relates in particular to a feed passage in which the fuel gas mixture is in an explosive state at the instant of the ignition action, that is to say, for example, in a section between a mixing unit and the combustion chamber. In this configuration, it is furthermore preferred that this central feed passage also at least partly forms the ignition passage, such that the ignition means are arranged in particular in this central feed passage. In this case, the supplementary gas feed preferably opens into a section of the central feed passage between the ignition device and the mixing chamber.

In addition, it is also proposed that the ignition device comprises at least one delivery device for the supplementary gas and a stop valve. Thus provision is made in particular for the feed means to be switched on, for example, only if there is an abnormal occurrence; that is to say, when ignition is effected, the exhaust gas can also be quickly released, for example via the central valve, without activating the supplementary gas feed. The delivery device is in this case designed in such a way that it can feed the supplementary gas even at the positive pressures in the deburring chamber described at the beginning; thus said delivery device can provide in particular a delivery pressure which is above the positive pressure in the combustion chamber.

Finally, it is also considered to be advantageous with regard to the device for the thermal deburring of workpieces that a central valve is provided for at least the deburring chamber or the feed means, via which central valve the fuel gas mixture can be removed from the deburring chamber or the feed means, the central valve being constructed with a cooling means. The provision of such a cooling means has an effect on the development of the temperature of the central valve during the rapid outflow of the fuel gas mixture, such that the risk of self-ignition can be further reduced with a corresponding cooling means. Although simple convective cooling means may be sufficient in some cases, a cooling means having a heat exchange fluid is preferred. Safety is of course greatest if no ignitable mixture at all is present, since even the presence of an ignition source then does no harm. The deburring chamber and its inertization volumes are therefore preferably designed for a maximum temperature of 100° C.

According to a further aspect of the invention, a method of removing an explosive fuel gas mixture from a device for thermal deburring is proposed, said method comprising at least the following steps:

feeding a fuel gas mixture into a device for thermal deburring and removing at least some of the fuel gas mixture, a supplementary gas being brought at least partly into contact with said fuel gas mixture before the latter flows out of the device.

This method can be carried out in particular with the device described here according to the invention.

To this extent, in particular a method is described here in which it is necessary, on account of an abnormal occurrence or a misfire, to remove the explosive fuel gas mixture still located in the combustion chamber. In order to be able to realize high outflow velocities in the process and thus keep the downtime of the device for the thermal deburring short, a supplementary gas is brought into contact with at least some of the fuel gas mixture which leaves the deburring chamber. Furthermore, all the other critical, small flow cross sections (e.g. having a diameter of less than 2 cm) can also be appropriately inertized. In the process, the supplementary gas is advantageously fed in such a way that the fuel gas mixture is admixed uniformly with the supplementary gas and/or that, for example, the supplementary gas encloses the outflowing fuel gas mixture like an envelope jet. To this extent, the supplementary gas can be fed in centrally to the fuel gas mixture and/or in such a way as to be distributed in the circumferential direction.

In the method described here, nitrogen and/or carbon dioxide are/is preferably fed as supplementary gas to the fuel gas mixture. In principle, a number of other supplementary gases are also suitable, such as water vapor for example. It may also suffice to bring the gas mixture outside the ignitable range. This can even be effected by the addition of oxygen until the gas mixture falls below a lower explosion limit by dilution or by the addition of fuel gas, that is to say by saturation until an upper explosion limit is exceeded. Thus oxygen or fuel gas can also act as supplementary gas within the scope of the present invention. However, if oxygen is added to the environment when flowing out, saturation with fuel gas is not necessarily appropriate, since the mixture may again reach the ignitable range when flowing out. Inertization with nitrogen and/or carbon dioxide is therefore preferred, the effect of said inertization being that the gas mixture is no longer explosive and therefore a potential ignition source cannot cause an explosion. The following limits apply:

| Fuel gas: | Nitrogen: | Carbon dioxide: |
|---|---|---|
| Methane | 11 | 5 |
| Hydrogen | 17 | 12 |

The values specified in the table apply to the complete inertization; the specified numerical value is the minimum value for the ratio of the mol fractions of supplementary gas to the mol fractions of fuel gas. The supplementary gas is advantageously fed at a temperature of about 20° C.

According to a development of the method, the fuel gas mixture is present at the start of the removal with a charging pressure in the deburring chamber, the supplementary gas being introduced with a feed pressure which is so much greater than the charging pressure that a rapid feed of supplementary gas is possible. It is possible in principle to keep the feed pressure constant, but the feed pressure may nonetheless also be adapted to the charging pressure decreasing in the course of the removal of the fuel gas mixture.

In addition, it is considered to be advantageous that the fuel gas mixture is removed via a central valve.

BRIEF DESCRIPTION OF THE DRAWINGS

The invention is explained in more detail below with reference to the attached figures. It should be noted that the figures show preferred embodiment variants of the invention, but are not limited thereto. In the drawing.

DETAILED DESCRIPTION OF THE INVENTION

Figure 1:
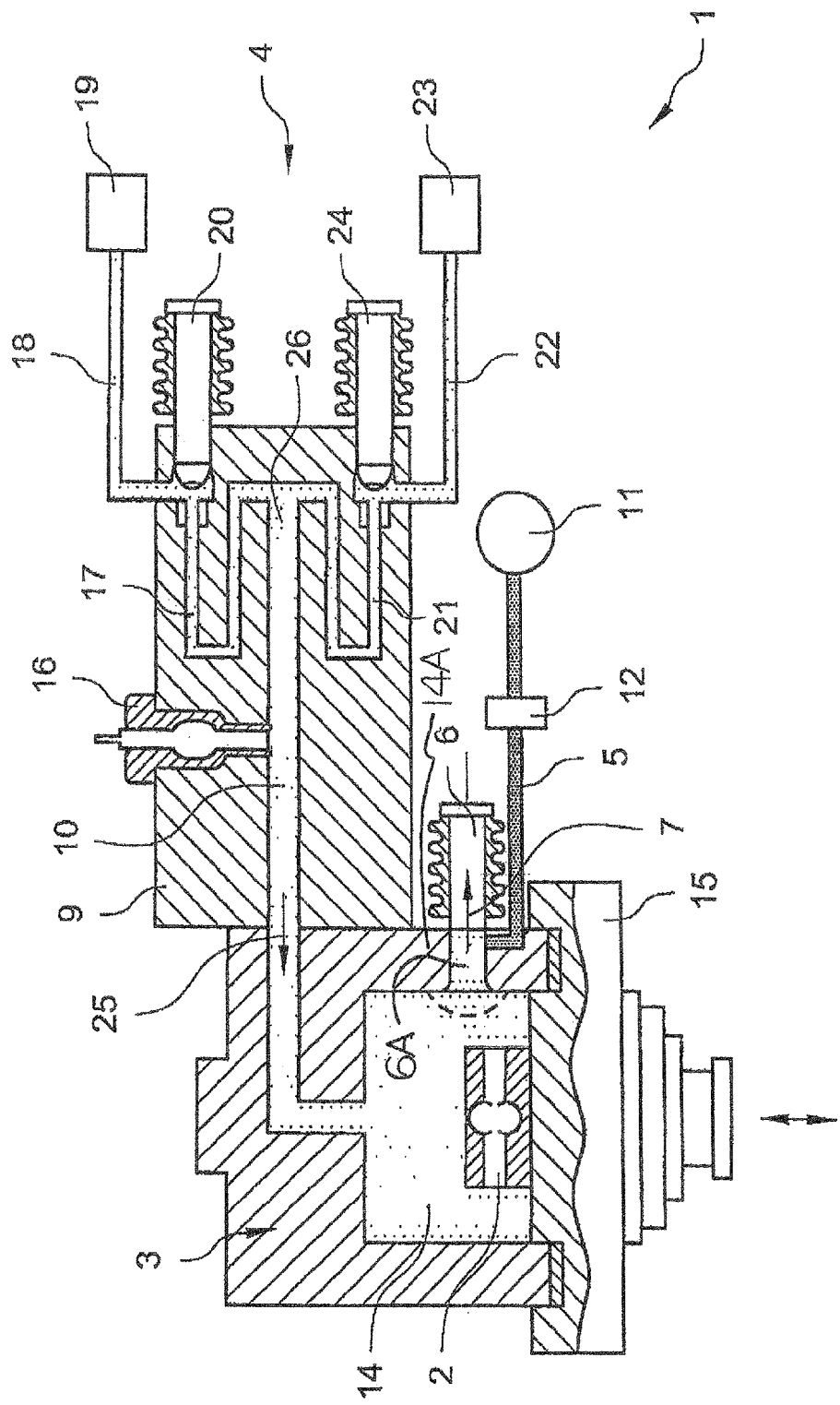
FIG. 1 schematically shows a first embodiment variant of the device according to the invention, and
FIG. 2 schematically shows a further embodiment variant of the device according to the invention.

FIG. 1 shows a simplified illustration of a device 1 for the thermal deburring of workpieces 2. The device 1 illustrated is divided essentially into two sections, namely a deburring chamber 3, which is shown in the left-hand region of FIG. 1, and a feed means 4, which is shown in the right-hand half of FIG. 1, for introducing a fuel gas mixture into the deburring chamber 3.

In this device 1, the deburring chamber 3 together with a closing plate 15 forms a combustion chamber 14 with a chamber wall 14A, in which the workpiece 2 is positioned for the treatment. To load the deburring chamber 3 with the workpiece 2 and to unload the workpiece 2 from the deburring chamber 3, the closing plate 15 is vertically movable, as indicated underneath by the double arrow. The combustion chamber 14 is now provided with a feed passage for the fuel gas mixture. The feed passage directly adjoins the feed means 4, which is located in a directly adjacent position. In the case shown, the feed means 4 is formed with a mixing block 9 which is directly positioned at the deburring chamber 3. In this case, the mixing block 9 is oriented opposite the deburring chamber 3 in such a way that a continuous central feed passage 10 is formed. A fuel gas bore 17 and an oxygen gas bore 21 open into this central feed passage 10 inside the mixing block 9, such that a mixing chamber 26 is formed at the end of the central feed passage 10.

In this case, fuel gas is introduced in such a way that the fuel gas is tapped from a fuel gas reservoir 19 and is transported via a fuel gas line 18 to a fuel gas filling unit 20. The oxygen for the fuel gas mixture is also provided in a corresponding manner. Thus the oxygen is fed from an oxygen gas reservoir 23 via an oxygen gas line 22 to an oxygen gas filling unit 24. The fuel gas filling unit 20 and the oxygen gas filling unit 24 now provide the desired quantities and if need be pressures, such that the desired fuel-gas/oxygen-gas mixture can be introduced in the inflow direction 25 through the central feed passage 10 into the combustion chamber 14.

In the embodiment variant illustrated here, a spark plug 16 is positioned in the central feed passage 10, such that the fuel gas mixture is normally ignited there, and therefore the flame front propagates through the feed passage 10 right through to the combustion chamber 14 and thus to the workpiece 2.

In addition, the deburring chamber 3 is provided with a central valve 6, via which the fuel gas mixture can be quickly removed from the deburring chamber 3 or the combustion chamber 14, for example in the event of a misfire. To this end, the fuel gas mixture flows in outflow direction 7 after the central valve 6 has been opened. The central valve 6 is connected to a passageway 6A extending through the deburring chamber wall 14A. The passageway 6A is separate from the central feed passage 10. Furthermore, the central valve 6 is external to the deburring chamber and is an outlet for the fuel gas mixture. In order to make possible especially high flow velocities here during the releasing of the explosive fuel gas mixture located in the combustion chamber 14, a supplementary gas feed 5 is provided between the combustion chamber 14 and the central valve 6. Here, the supplementary gas feed 5 comprises a delivery device 11 and a stop valve 12 which influence the operation of the supplementary gas feed 5. In the event of the supplementary gas feed 5 being activated, for example by an associated control unit, the stop valve 12 is opened and the supplementary gas is introduced into the deburring chamber 3 by the delivery device 11, this advantageously being effected in the immediate vicinity of the outlet bore of the deburring chamber 3. Thus at least the partial volume of the fuel gas mixture which discharges in outflow direction 7 is inertized, such that self-ignition on account of the gas friction during the flow through this outlet bore or the central valve 6 is avoided.

Figure 2:
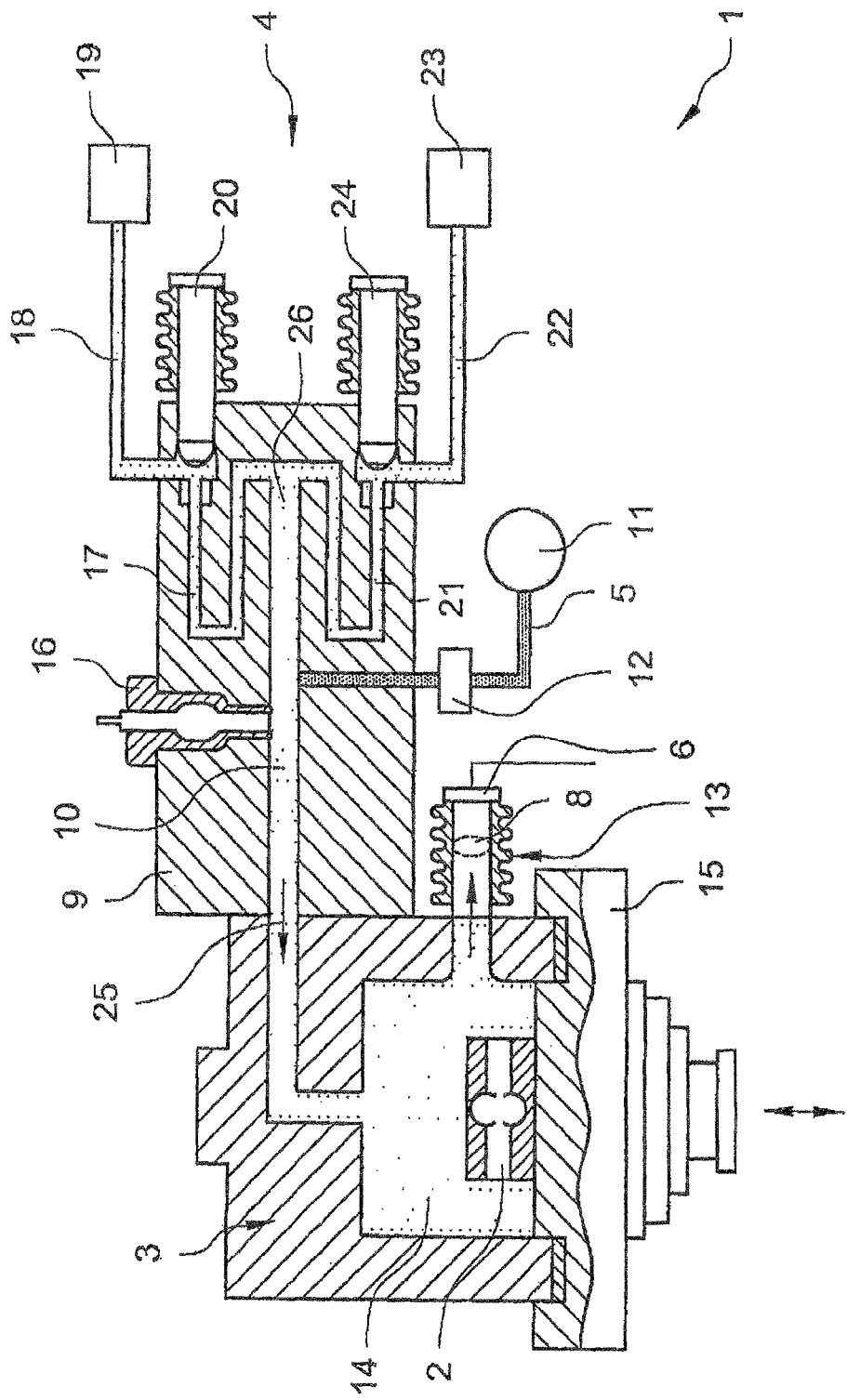

FIG. 2 shows a further embodiment variant of the device 1 for the thermal deburring of workpieces 2. The construction is similar to the construction of the device from FIG. 1, and therefore reference is made in this respect in particular with regard to the configuration of the deburring chamber 3 and of the feed means 4. It should be noted here that the same designations have been specified for the same components.

This deburring chamber 3 also has a central valve 6, via which the fuel gas mixture can be removed from the deburring chamber 3. In order to be able to allow a considerable proportion of the fuel gas mixture to flow out in the process in as short a time as possible, the central valve 6 is in this case designed with a flow cross section 8 which is preferably greater than 5 mm$^2$. In addition, the central valve 6 is constructed with a cooling means 13.

In this embodiment variant, in contrast to FIG. 1, the supplementary gas feed 5 is connected to the feed means 4. The supplementary gas feed 5 opens in this case into the central feed passage 10, to be precise in a region between the spark plug 16 and the ends of the fuel gas bore 17 and of the oxygen gas bore 21 and the mixing chamber 26. This supplementary gas feed 5, too, again has a stop valve 12 and a suitable delivery device 11 for the supplementary gas. In such an arrangement of the supplementary gas feed 5, if an abnormal occurrence is established or if the supplementary gas feed 5 is activated, the supplementary gas is first of all introduced into the feed passage 10, this taking place at such a pressure that the supplementary gas spreads right through into the combustion chamber 14 and therefore results in the fuel gas mixture being entirely inertized. It is only after sufficient inertization has taken place that the central valve 6 is opened. Such a device is especially suitable when work is carried out with low charging pressures for the thermal deburring. The pressure increase as a result of the feeding of the supplementary gas also leads to the fuel-gas mixture/supplementary-gas mixture being able to flow out more quickly via the central valve 6.

With the invention described here, it is possible for a supplementary gas (e.g. nitrogen) to be fed to the fuel gas mixture (e.g. via a central valve in the mixing block) before the deburring chamber is opened until the fuel gas mixture is no longer ignitable. As soon as this state is achieved, venting can be effected with the largest possible cross section via a central valve. In addition, it is possible to partly inertize the location at which increased gas friction is to be expected. Thus, for example, the outflow edge at the central valve can be alternatively or additionally inertized in order to allow no explosive atmospheres here. Thus especially quick removal of the explosive fuel gas mixture from the deburring chamber can be realized, such that the device for thermal deburring is available for use again within a short time.

The invention claimed is:

1. A method of removing an explosive fuel gas mixture from a chamber for thermal deburring, comprising:
    feeding a fuel gas mixture into the chamber for thermal deburring through a central feed passage;
    thereafter removing at least some of the fuel gas mixture through a passageway extending through a wall of the deburring chamber, wherein the passageway is separate from the central feed passage; and
    while the fuel gas is being removed, introducing a supplementary gas into the passageway and into contact with said fuel gas mixture while the latter flows out of the deburring chamber, whereby the fuel gas mixture is removed via a central valve connected to the passageway and wherein, a discharged volumetric flow has a mol ratio of supplementary gas to fuel gas outside the explosion limits.

2. The method as claimed in claim 1, whereby nitrogen and/or carbon dioxide is fed as supplementary gas to the fuel gas mixture.

3. The method as claimed in claim 1, whereby the fuel gas mixture is present at the start of the removal with a charging pressure in a deburring chamber, the supplementary gas being introduced with a feed pressure which is greater than the charging pressure.

* * * * *